United States Patent
Kasagi et al.

(10) Patent No.: US 11,015,730 B2
(45) Date of Patent: May 25, 2021

(54) SOLENOID VALVE

(71) Applicants: Eagle Industry Co., Ltd., Tokyo (JP); JATCO Ltd, Shizuoka (JP)

(72) Inventors: Yoshinari Kasagi, Tokyo (JP); Hiroyuki Iwanaga, Tokyo (JP); Wataru Matsushima, Shizuoka (JP); Hironori Dosho, Shizuoka (JP)

(73) Assignees: EAGLE INDUSTRY CO., LTD.; JATCO LTD.

( * ) Notice: Subject to any disclaimer, the term of this patent is extended or adjusted under 35 U.S.C. 154(b) by 57 days.

(21) Appl. No.: 16/466,264

(22) PCT Filed: Nov. 15, 2017

(86) PCT No.: PCT/JP2017/041033
§ 371 (c)(1),
(2) Date: Jun. 3, 2019

(87) PCT Pub. No.: WO2018/105337
PCT Pub. Date: Jun. 14, 2018

(65) Prior Publication Data
US 2020/0063885 A1 Feb. 27, 2020

(30) Foreign Application Priority Data
Dec. 8, 2016 (JP) .............................. JP2016-238890

(51) Int. Cl.
*F16K 31/06* (2006.01)
*F16K 27/02* (2006.01)
(Continued)

(52) U.S. Cl.
CPC .............. *F16K 31/06* (2013.01); *F16K 1/123* (2013.01); *F16K 11/07* (2013.01); *F16K 27/029* (2013.01);
(Continued)

(58) Field of Classification Search
CPC .. F16K 31/0693; F16K 31/10; F16K 31/0613; F16K 27/029; F16K 11/0716; B60T 8/363; B60T 8/3665
(Continued)

(56) References Cited

U.S. PATENT DOCUMENTS 4,540,154 A * 9/1985 Kolchinsky ........... F16K 31/408
137/315.03
4,662,605 A * 5/1987 Garcia ................ F16K 31/0613
251/129.08
(Continued)

FOREIGN PATENT DOCUMENTS

| CN | 1619115 | 5/2005 | ................ F01L 1/34 |
| CN | 102449362 | 5/2012 | ............. F16K 31/06 |

(Continued)

OTHER PUBLICATIONS

International Search Report (w/translation) and Written Opinion (w/machine translation) issued in application No. PCT/JP2017/041033, dated Feb. 13, 2018 (11 pgs).
(Continued)

Primary Examiner — Seth W. Mackay-Smith
(74) Attorney, Agent, or Firm — Hayes Soloway P.C.

(57) ABSTRACT

A solenoid valve has a spool is moved via a rod. A breathing hole penetrates a sleeve in a radial direction and allows an inner space of a housing part to communicate with the outside when at least a circular columnar plunger is in a predetermined region provided on a solenoid case side of the sleeve. A through-hole is formed in an axial direction at the center axis of the circular columnar plunger. The rod is configured such that an opposing groove portion passes through the center of the circular columnar plunger in the radial direction and penetrates both radial sides provided with cutout portions of the rod formed at an opposing end portion facing a circular columnar plunger side and an inner
(Continued)

surface of the opposing groove portion formed in a symmetrical arc shape as viewed in the radial direction.

2 Claims, 7 Drawing Sheets (51) Int. Cl.
  *F04B 27/18*   (2006.01)
  *B60T 8/36*   (2006.01)
  *F16K 11/07*   (2006.01)
  *F16K 1/12*   (2006.01)
  *F01L 1/344*   (2006.01)

(52) U.S. Cl.
  CPC ....... *B60T 8/363* (2013.01); *F01L 2001/3443* (2013.01); *F04B 2027/1822* (2013.01)

(58) Field of Classification Search
  USPC .......................... 251/129.07, 129.15, 129.16
  See application file for complete search history.

(56) References Cited

U.S. PATENT DOCUMENTS

| | | | | |
|---|---|---|---|---|
| 5,083,747 | A * | 1/1992 | Schmitt-Matzen | B60T 8/3635 137/625.65 |
| 5,088,467 | A * | 2/1992 | Mesenich | F02M 51/08 123/531 |
| 5,263,647 | A * | 11/1993 | Cerny | F02M 51/061 239/585.1 |
| 5,845,672 | A * | 12/1998 | Reuter | B60T 8/3675 137/315.03 |
| 5,884,850 | A * | 3/1999 | Norgauer | F02M 51/0675 239/483 |
| 5,901,941 | A * | 5/1999 | Ricco | F02M 47/027 239/585.3 |
| 6,202,699 | B1 * | 3/2001 | Meyer | F16K 31/0668 137/884 |
| 6,968,816 | B2 * | 11/2005 | Isobe | F01L 1/022 123/90.12 |
| 7,299,998 | B2 * | 11/2007 | Ricco | F02M 47/027 239/585.1 |
| 7,938,143 | B2 * | 5/2011 | Nagasaki | F16K 31/0613 137/625.68 |
| 8,931,758 | B2 * | 1/2015 | Kasagi | F16K 31/0613 251/129.07 |
| 9,068,577 | B2 * | 6/2015 | Kasagi | F16K 31/0613 |
| 2002/0139951 | A1 * | 10/2002 | Kawamura | F16K 31/0613 251/129.15 |
| 2003/0020039 | A1 * | 1/2003 | Haeberer | F02M 63/0017 251/129.16 |
| 2003/0141475 | A1 * | 7/2003 | Ruthardt | F02M 47/027 251/129.16 |
| 2005/0139273 | A1 * | 6/2005 | Morselli | F16K 31/0693 137/625.64 |
| 2005/0178991 | A1 * | 8/2005 | Goossens | B60T 8/363 251/129.07 |
| 2005/0230438 | A1 * | 10/2005 | Saidman | B05C 5/0225 222/504 |
| 2008/0315140 | A1 * | 12/2008 | Hamaoka | F16K 31/0613 251/129.15 |
| 2009/0026399 | A1 * | 1/2009 | Ishibashi | F16K 31/0613 251/129.15 |
| 2009/0032753 | A1 * | 2/2009 | Ishibashi | H01F 7/081 251/129.15 |
| 2009/0140192 | A1 * | 6/2009 | Yamamoto | G05D 16/2026 251/129.15 |
| 2012/0175540 | A1 * | 7/2012 | Hase | F16K 31/0613 251/129.15 |
| 2012/0199771 | A1 * | 8/2012 | Kasagi | F16K 31/0613 251/129.15 |
| 2013/0061959 | A1 * | 3/2013 | Stephens | F15B 21/041 137/544 |
| 2016/0208937 | A1 * | 7/2016 | Yamaki | F16K 15/042 |
| 2017/0314700 | A1 * | 11/2017 | Iwanaga | F16K 27/048 |

FOREIGN PATENT DOCUMENTS

| | | | |
|---|---|---|---|
| CN | 203703241 | 7/2014 | ............. F16K 11/07 |
| JP | 2009063022 | 3/2009 | ............. F16K 11/07 |
| JP | 2010071358 | 4/2010 | ............. F16K 31/06 |
| WO | WO2011052371 | 5/2011 | ............. F16K 31/06 |
| WO | WO2016076188 | 5/2016 | ............. F16K 31/06 |

OTHER PUBLICATIONS

Chinese Office Action (w/translation) issued in application No. 201780075313.5, dated Jun. 8, 2020 (12 pgs).
Chinese Office Action (w/translation) issued in application No. 201780075313.5, dated Dec. 4, 2019 (14 pgs).
International Preliminary Report on Patentability issued in application No. PCT/JP2017/041033, dated Jun. 11, 2019 (6 pgs).

* cited by examiner

SOLENOID VALVE

TECHNICAL FIELD

The present invention relates to a solenoid valve, and specifically relates to a solenoid valve used for hydraulic control of a hydraulic circuit.

BACKGROUND ART

A conventional hydraulic control solenoid valve has been known, which includes a valve portion having a spool housed in a sleeve and a solenoid portion having a solenoid case housing a plunger configured to drive the spool in an axial direction and a molded solenoid configured such that a solenoid is covered with resin and which is arranged between a pressure source of a pump or an accumulator and a load side to supply, by driving of the spool, pressure- or flow-rate-adjusted control oil to the load side (see, e.g., Patent Citation 1).

The spool has a relatively-large drive stroke. Thus, in the case of driving the solenoid portion, there is a probability that fluid in an inner space of a housing part housing the plunger provides resistance to block quick movement of the plunger. For this reason, for the typical solenoid valve, there is a necessity that a breathing hole communicating with the outside is provided and communication between the housing part and the breathing hole is allowed such that fluid (hereinafter merely referred to as "fluid") such as air or oil is exchanged between the housing part and the outside and fluid in a movement direction of the plunger is discharged. This handles the fluid resistance.

However, new fluid corresponding to the amount of fluid discharged by movement of the plunger flows into the housing part from the outside through the breathing hole in OFF operation of the plunger. This leads to such a structure that contaminants present around the outside of the solenoid valve tend to enter the solenoid valve. For this reason, as described in Patent Citation 2, a through-hole is provided in an axial direction at a plunger, and fluid present in spaces on both sides of the plunger in the axial direction is moved through the through-hole in a housing part upon movement of the plunger. With this configuration, the flow rate of inflow fluid from the outside through a breathing hole is reduced, and entrance of contaminants into the housing part is reduced.

In this solenoid valve, a spool is moved via a shaft (a rod) arranged between the spool and the plunger. The shaft is in a substantially tubular shape in which one end in the axial direction opens and the other end in the axial direction is closed, and a through-hole is provided in a circumferential direction at the shaft. Moreover, a structure is employed, in which when the plunger moves to a side opposite to a sleeve, fluid having flowed from the through-hole provided at the plunger flows into a sleeve-side space of the housing part through the opening, the tubular inner portion, and the through-hole of the shaft.

CITATION LIST

Patent Literature

Patent Citation 1: International Publication No. 2011/052371 (Page 7, FIG. 1)

Patent Citation 2: JP 2009-63022 A (Page 3, FIG. 9)

SUMMARY OF INVENTION

Technical Problem

However, in the solenoid valve as described in Patent Citation 2, the spool is moved via the shaft arranged between the spool and the plunger. Although the structure in which stress in the axial direction is on the shaft is employed, the shaft is formed in the hollow substantially-tubular shape, and for this reason, sufficient durability is not provided. Thus, there is a probability that the shaft is deformed.

The present invention has been made in view of this problem, and is intended to provide a solenoid valve configured so that fluid movement by plunger movement can be smoothly performed and high durability of a rod can be provided.

Solution to Problem

For solving the above-described problem, a solenoid valve of the present invention according to a first aspect of the present invention includes a spool, a sleeve in which the spool is arranged movably in an axial direction, a circular columnar plunger arranged on a first end side of the spool to move the spool, a spring arranged on a second end side of the spool to bias the spool against movement by the circular columnar plunger, a molded solenoid arranged at the outer periphery of the circular columnar plunger, a solenoid case configured to house the circular columnar plunger and the molded solenoid, a housing part housed in the solenoid case and arranged inside the molded solenoid to house the circular columnar plunger in an inner space of the hosing portion, and a rod arranged in the inner space of the housing part and arranged between the spool and the circular columnar plunger on an extension of the center axis of the circular columnar plunger. The solenoid valve moves the circular columnar plunger by energization to the molded solenoid. The spool is moved via the rod. The sleeve has, on a solenoid case side, a breathing hole penetrating the sleeve in the radial direction and allowing the inner space of the housing part to communicate with the outside when at least the circular columnar plunger is in a predetermined region. The circular columnar plunger has a through-hole formed in the axial direction at the center axis of the circular columnar plunger.

The rod is formed as a solid, and configured such that flange portions extending outwardly in symmetry directions of the radial direction are provided at an opposing end portion facing the circular columnar plunger, cutout portions forming a passage between the rod and the inner periphery of the housing part are formed across the axial direction on both sides in the radial direction perpendicular to the flange portions as viewed in the axial direction, an opposing groove portion passing through the center of the circular columnar plunger in the radial direction and penetrating both radial sides provided with the cutout portions of the rod is formed at the opposing end portion, and an inner surface of the opposing groove portion is formed in a symmetrical arc shape as viewed in the radial direction.

According to the feature of the first aspect, when the circular columnar plunger moves, fluid present in spaces on both sides of the circular columnar plunger can be moved between both sides of the circular columnar plunger in a movement direction thereof in the housing part through the through-hole formed at the plunger and the opposing groove portion formed at the rod. Moreover, the inside of the housing part housing the circular columnar plunger and the outside communicate with each other via the cutout portions of the rod and the breathing hole of the sleeve. Thus, a large space for fluid movement can be ensured, and fluid movement is made without accumulation. Moreover, there is no probability that movement of the circular columnar plunger is blocked due to stalled fluid movement. The rod itself is formed as the solid, and the inner surface of the opposing groove portion penetrating in the radial direction is formed in the symmetrical arc shape as viewed in the radial direction. Thus, durability of the rod for transmitting movement of the circular columnar plunger to the spool can be enhanced while the rod can be formed without stress on the rod due to movement being concentrated on part of the inner surface of the opposing groove portion.

In the solenoid valve according to a second aspect of the present invention, the inner space of the housing part and the breathing hole constantly communicate with each other.

According to the feature of the second aspect, a breathing path and the inside of the housing part communicate with each other even in an OFF state of the solenoid valve. Thus, breathing can be performed between the inner space of the housing part and the outside at the beginning of movement of the plunger, and excellent responsiveness of the solenoid valve can be provided.

BRIEF DESCRIPTION OF DRAWINGS

FIG. 6 is a B-B sectional view of the solenoid valve shown in FIG. 1 for describing a breathing path in a state upon switching of the solenoid valve from OFF to ON.

DESCRIPTION OF EMBODIMENTS

Hereinafter, the mode for carrying out a solenoid valve according to the present invention will be described with reference to an embodiment.

Embodiment

A solenoid valve according to the embodiment of the present invention will be described with reference to FIGS. 1 to 7.

The solenoid valve 3 is a spool type solenoid valve, and is used for a device to be controlled by hydraulic pressure, such as an automatic transmission of a vehicle. One configured such that the solenoid valve 3 is incorporated into a valve housing 2 as illustrated in FIGS. 2 and 3 will be referred to as a "solenoid valve device 1."

Figure 1:
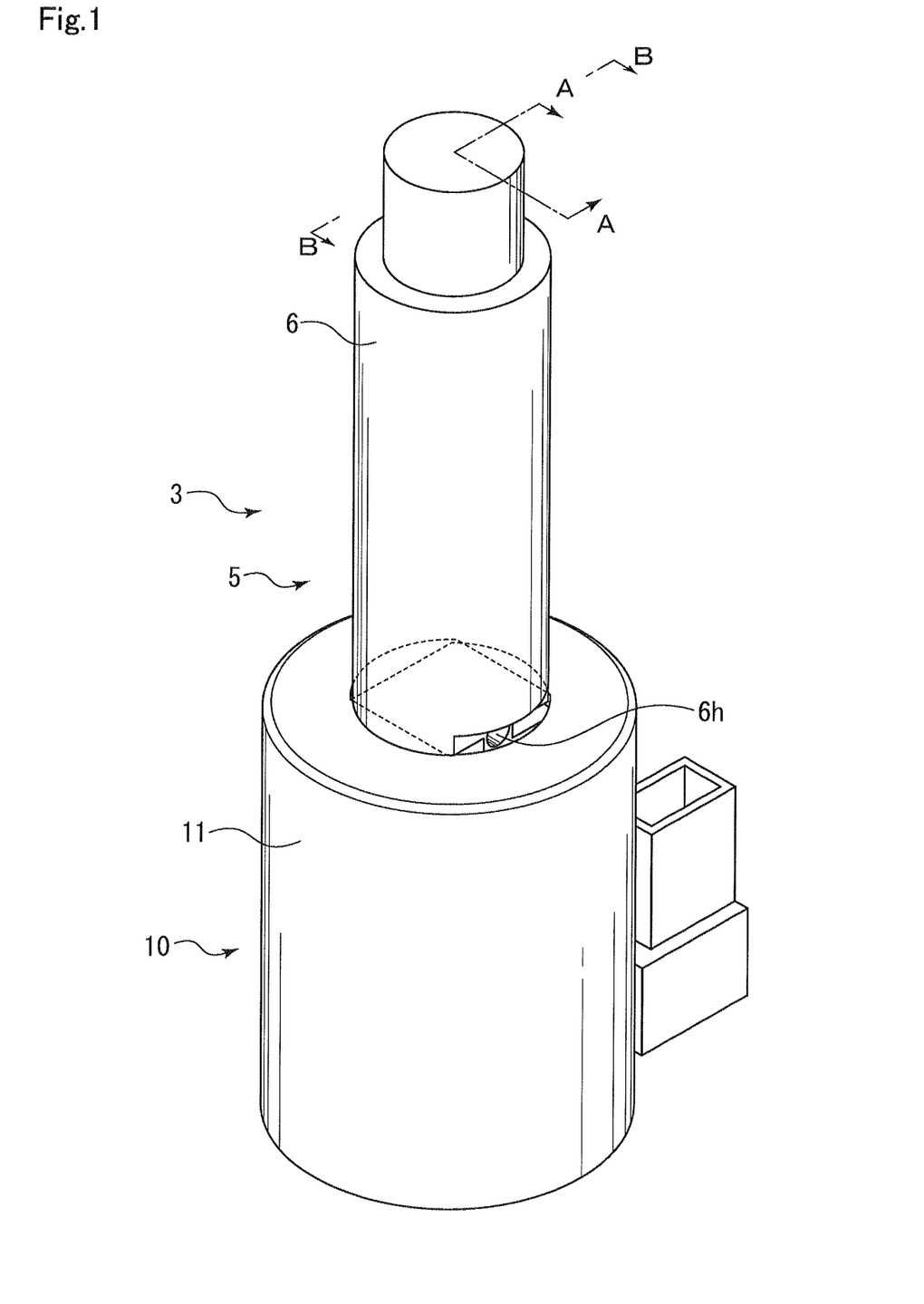
FIG. 1 is a perspective view of a solenoid valve according to an embodiment of the present invention.

As illustrated in FIG. 1, the solenoid valve 3 is configured such that a valve portion 5 as a valve configured to adjust the flow rate of fluid is integrally attached to a solenoid portion (a linear solenoid) 10 as an electromagnetic drive unit. Details of attachment of the valve portion 5 will be described later.

Figure 2:
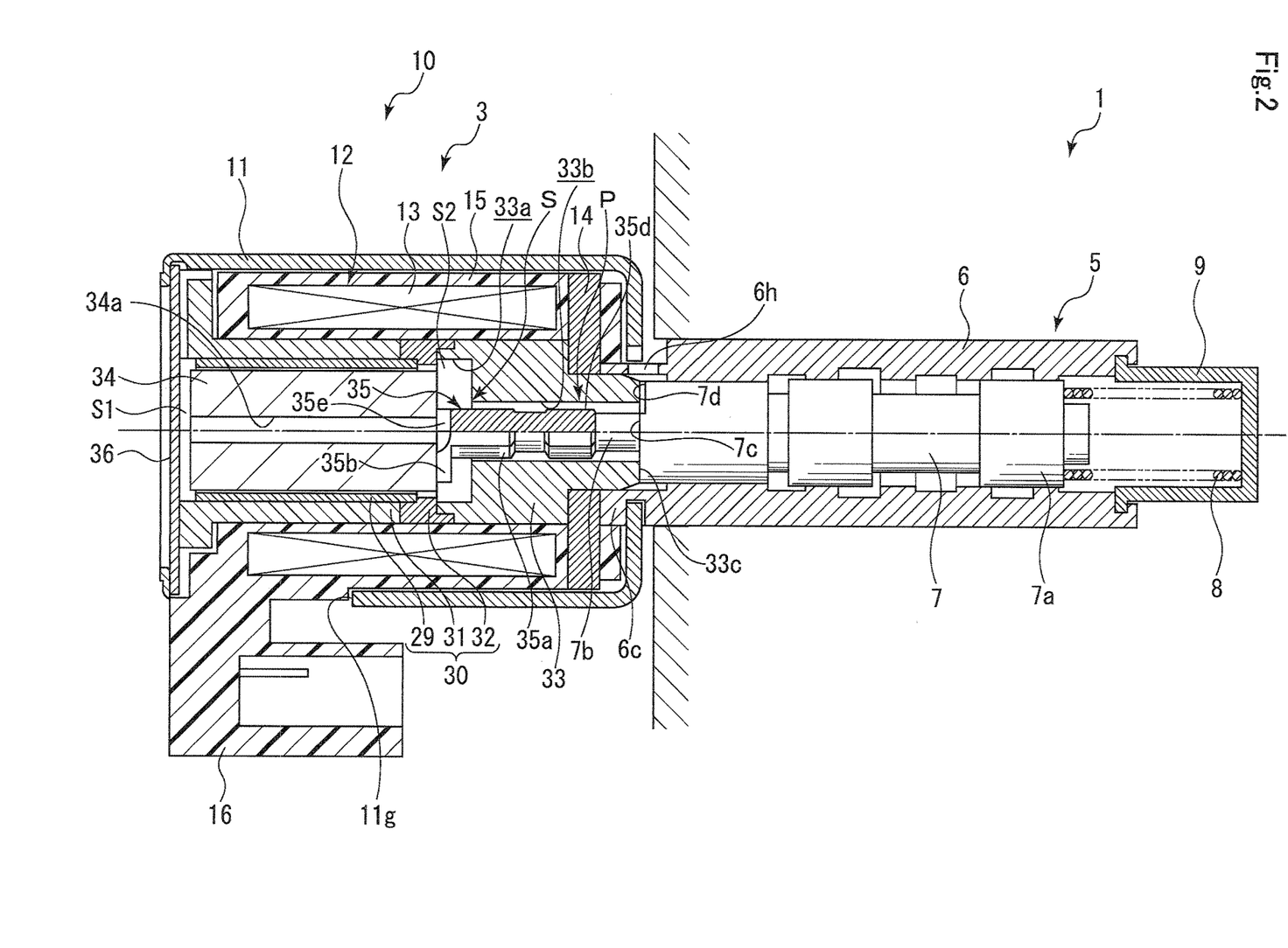
FIG. 2 is an A-A sectional view of the solenoid valve shown in FIG. 1 and a valve housing.
Figure 3:
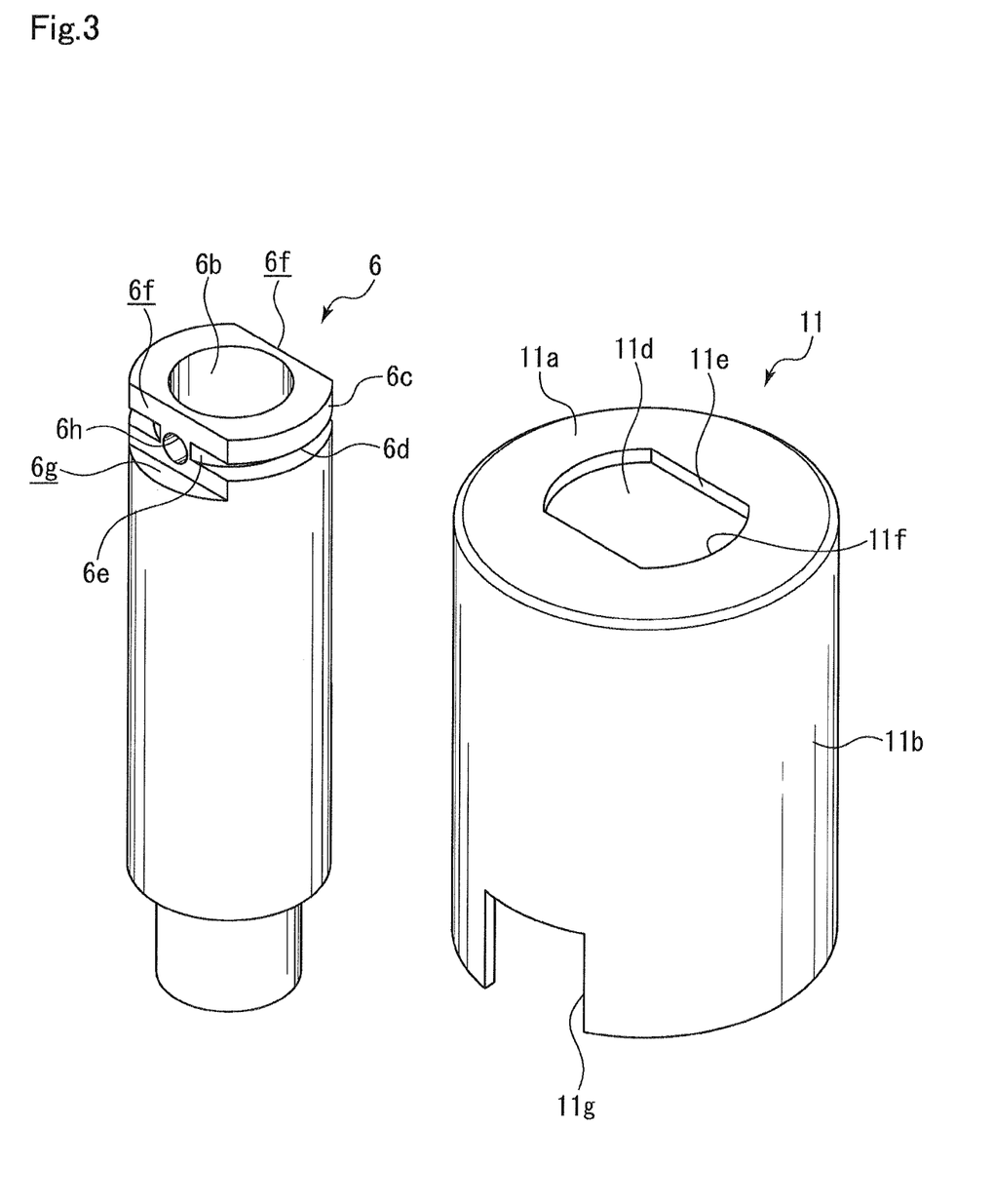
FIG. 3 is a perspective view of a sleeve and a solenoid case forming the solenoid valve in the embodiment.

As illustrated in FIGS. 2 and 3, the valve portion 5 includes a sleeve 6 having, at the outer periphery thereof, not-shown openings connected to a flow path (not shown) provided in the valve housing 2, such as a not-shown input port and a not-shown output port; a spool 7 housed in a through-hole 6b of the sleeve 6 in a liquid-tight manner and having multiple lands 7a; a coil-shaped spring 8 configured to bias the spool 7 downward in an axial direction; and a retainer 9 configured to hold the spring 8. This configuration is a well-known configuration as a spool valve, and therefore, detailed description thereof will be omitted. Note that the sleeve 6, the spool 7, and the retainer 9 are made of materials such as aluminum, iron, stainless steel, and resin.

As illustrated in FIG. 3, an end portion of the sleeve 6 is formed in a stadium shape having a pair of straight lines and a pair of arcs as viewed in the axial direction, and includes axial cut surfaces 6f formed on both sides of a cylinder along the axial direction, radial cut surfaces 6g formed along a radial direction, and a slit 6d formed in a circumferential direction at a spot apart from end surfaces of the end portion provided with the axial cut surfaces 6f. As described above, a flange 6c is formed at the end portion of the sleeve 6, and an arc-shaped engagement surface 6e is formed on an inner diameter side of the slit 6d. Further, each axial cut surface 6f is formed in a substantially H-shape. In addition, a breathing hole 6h as a drain port penetrating in the radial direction is formed at the axial cut surface 6f, and communicates with the through-hole 6b.

Figure 4:
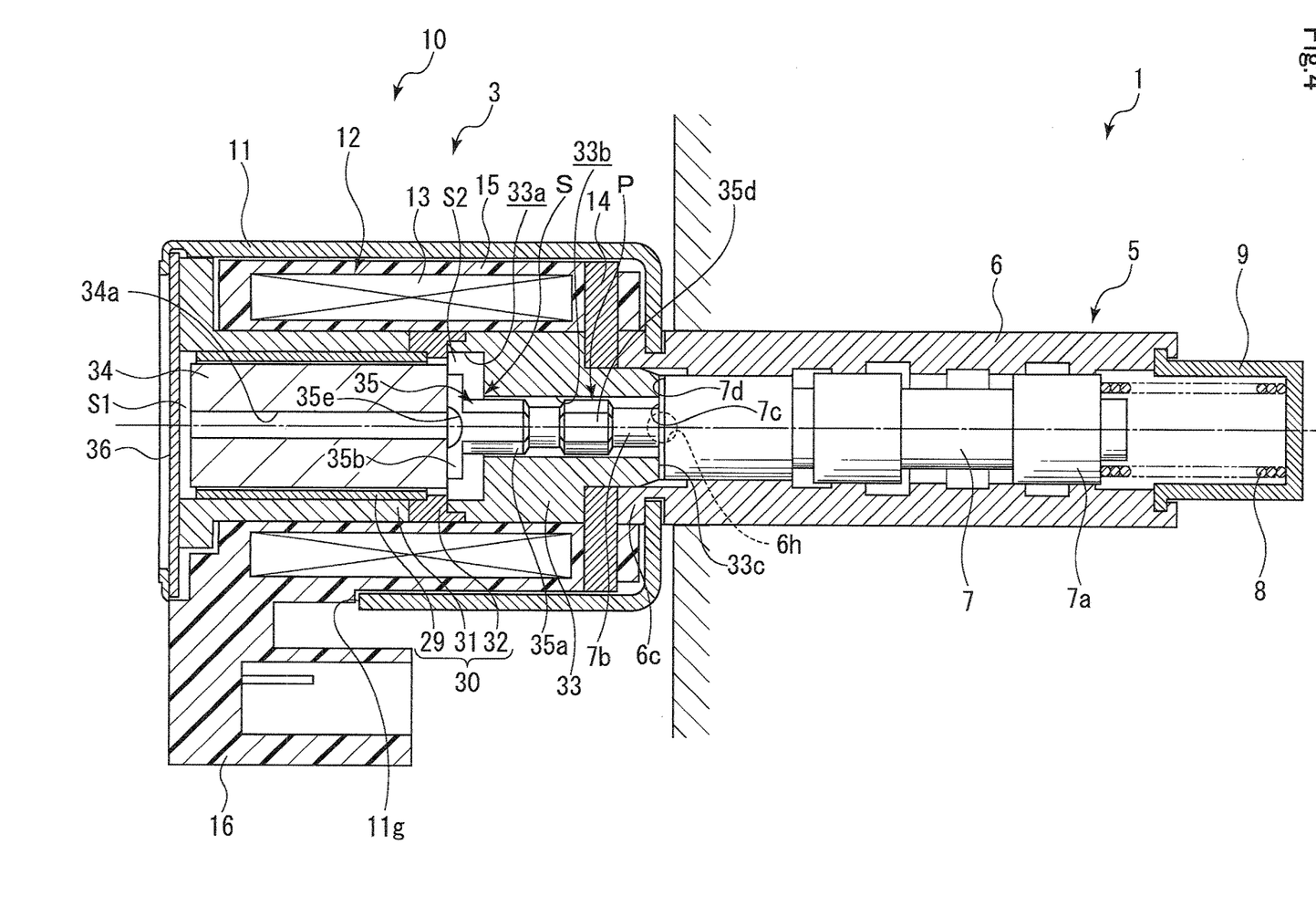
FIG. 4 is a B-B sectional view of the solenoid valve shown in FIG. 1 and the valve housing.

As illustrated in FIGS. 2 and 4, a small-diameter protruding portion 7b protruding into a through-hole of a center post 33 and a cutout 7d extending in the radial direction at the outer periphery of a shoulder portion 7c provided on a spring 8 side with respect to the protruding portion 7b and contacting an upper end surface of the center post 33 are formed at an end portion of the spool 7 on a plunger (a circular columnar plunger) 34 side. Moreover, in an OFF state of the solenoid valve 3 as illustrated in FIG. 2, the breathing hole 6h and an inner space S of a housing part 30 housing the plunger 34 and a rod 35 communicate with each other via the cutout 7d.

The solenoid portion 10 mainly includes a solenoid case 11, a molded solenoid 12 housed in the solenoid case 11, the housing part 30 housed in the molded solenoid 12, and an end plate 36 swaged to the solenoid case 11.

As illustrated in FIG. 3, the solenoid case 11 is in such a cup shape that a pipe-shaped cylindrical portion 11b is connected to a discoid plate portion 11a. At the center of the discoid plate portion 11a, a stadium-shaped opening 11d having linear portions 11e and arc portions 11f with a slightly-larger outer shape than that of the end portion of the sleeve 6 is formed. A cutout 11g into which a connector portion 16 is to be inserted is formed at an end portion of the cylindrical portion 11b.

As illustrated in FIG. 2, the molded solenoid 12 is configured such that a coil 13 and a lower plate 14 are, by mold forming, integrally formed with resin 15 and control voltage is supplied from a connector of the connector portion 16 extending outward of the solenoid case 11. The coil 13 is configured to generate a magnetic field corresponding to the control voltage, thereby generating drive force (magnetic attractive force) in the axial direction at the plunger 34 by the magnetic field. With the drive force, the spool 7 is moved against biasing force of the spring 8 in the axial direction via the plunger 34 and the rod 35.

The housing part 30 mainly includes an annular spacer 29 arranged on an inner peripheral side of an annular side ring 31 having a flange extending in the radial direction, a ring-shaped spacer 32, and the center post 33, these elements being provided on an inner peripheral side of the molded solenoid 12 and arranged in this order from an end plate 36 side.

In the inner space S of the housing part 30, the plunger 34 and the rod 35 are arranged movably in the axial direction. The plunger 34 is formed in a circular columnar shape, and is movable in the axial direction such that an outer peripheral surface of the plunger 34 is guided on an inner peripheral surface of the annular spacer 29. The rod 35 is arranged on an extension of the center of the plunger 34 in the radial direction, and is movable in the axial direction such that flange portions 35b described later in detail are guided on the inner periphery 33a of a large-diameter portion of the center post 33 and a main body portion 35a described later in detail is guided on the inner periphery 33b of a small-diameter portion of the center post 33. Moreover, the plunger 34 and the rod 35 are integrally movable. Note that the rod 35 and the protruding portion 7b of the spool 7 may be fixed to each other.

Next, one example of the steps of assembling the solenoid valve 3 will be described. First, the retainer 9 is swaged to the sleeve 6, and thereafter, the spring 8 and the spool 7 are inserted into the sleeve 6 to assemble the valve portion 5. Subsequently, the flange 6c of the sleeve 6 is inserted into the opening 11d of the solenoid case 11. The sleeve 6 is rotated 90 degrees about the axis at such a position that the slit 6d corresponds to the opening 11d, and in this manner, the sleeve 6 and the solenoid case 11 are retained with the linear portions 11e of the opening 11d being sandwiched by the slit 6d (a state illustrated in FIG. 1). The outer diameter of the engagement surface 6e defined by an inner circumferential surface of the slit 6d and a distance between both linear portions 11e of the opening 11d are substantially equal to each other. In the state illustrated in FIG. 1, inner surfaces of both linear portions 11e and the engagement surface 6e partially contact each other.

The molded solenoid 12 is inserted into the solenoid case 11, a stadium-shaped recessed portion (not shown) having the substantially same shape as the flange 6c of the sleeve 6 having a stadium sectional shape is fitted to the flange 6c, and a sleeve-6-side surface of the lower plate 14 contacts an opposing surface of the flange 6c. Then, when the housing part 30 is inserted into the molded solenoid 12, each of a shoulder portion of the center post 33 and the flange 6c contacts the lower plate 14 with the lower plate 14 being interposed therebetween, and the sleeve-6-side surface of the lower plate 14 contacts an opposing surface of the shoulder portion 7c of the spool 7 to slightly move the spool 7 against the biasing force of the spring 8 in the axial direction. At the end, the end plate 36 is swaged to an end portion of the solenoid case 11 on a side opposite to the sleeve 6, and in this manner, the solenoid valve 3 is assembled. In this state (shown in FIG. 2), the spool 7 is in such a state that the spool 7 is biased downward by the spring 8.

Figure 6:
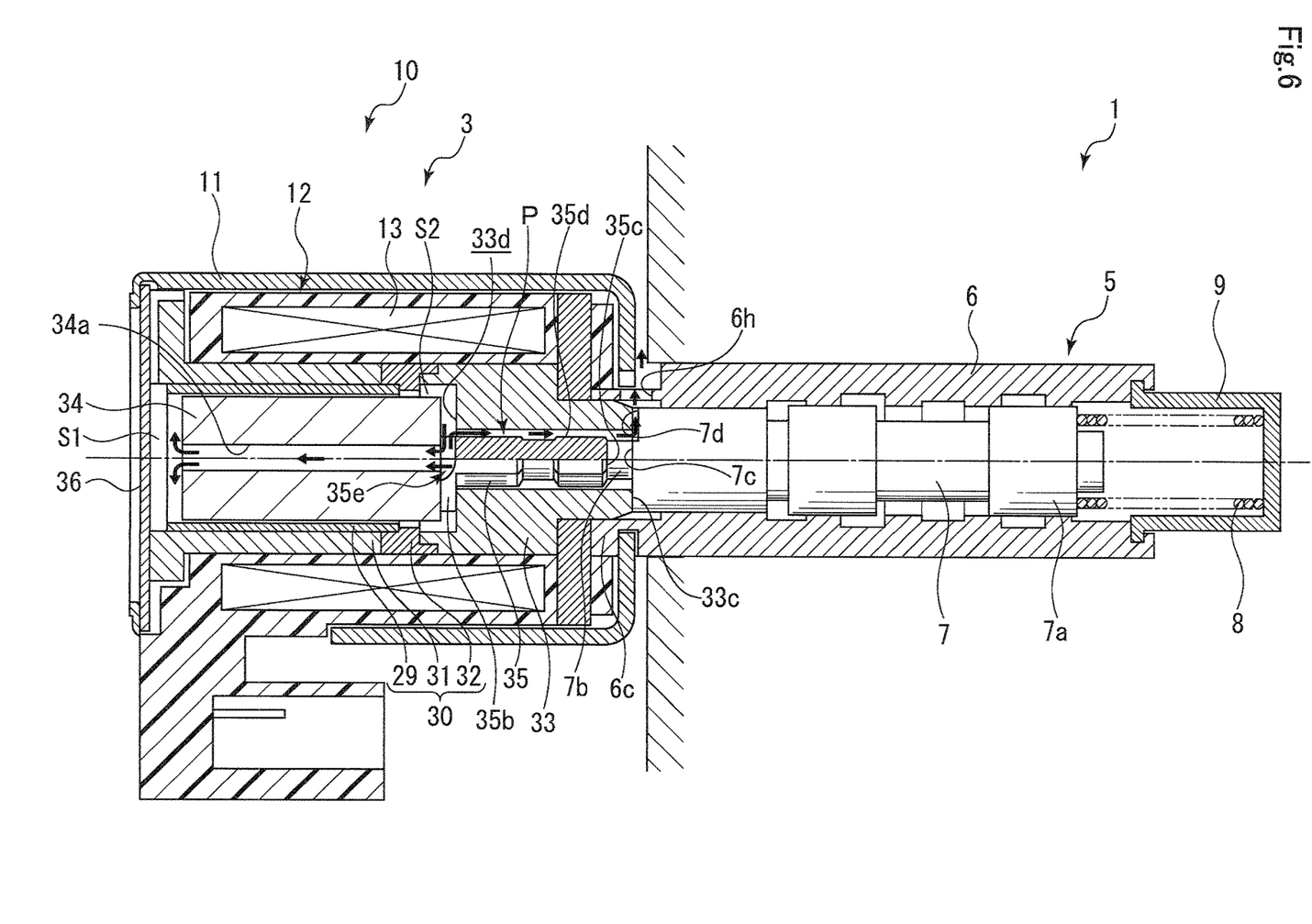

Next, operation of the solenoid valve 3 will be described. When control power is supplied in the OFF state illustrated in FIG. 2, the plunger 34 and the rod 35 are, as illustrated in FIG. 6, moved toward the valve portion 5 by the magnetic attractive force of the coil 13, and a valve-portion-5-side end portion 35c of the rod 35 pushes the protruding portion 7b of the spool 7 to move the spool 7 in the direction of the retainer 9. The amount of control fluid flowing from the not-shown input port of the valve portion 5 to the output port is determined by the position of (each land 7a of) the spool 7 in the sleeve 6. That is, as current to be supplied to the coil 13 increases, the amount of control fluid increases.

Figure 7:
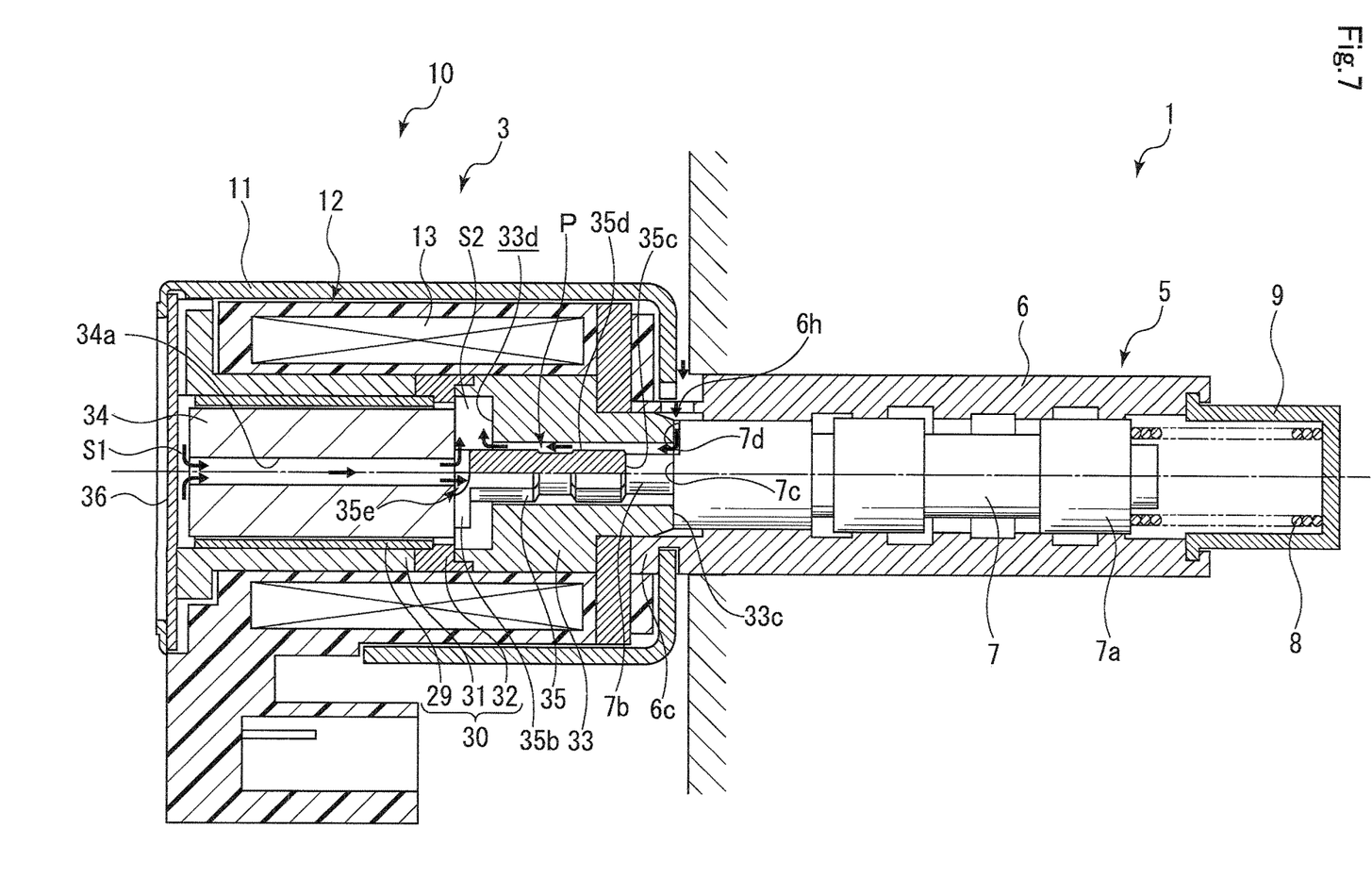
FIG. 7 is a B-B sectional view of the solenoid valve shown in FIG. 1 for describing the breathing path of the solenoid valve in a state upon switching of the solenoid valve from ON to OFF.

When the magnetic attractive force of the coil 13 is relatively weakened, the spool 7 moves toward the solenoid portion 10 by the biasing force of the spring 8 as illustrated in FIG. 7, the shoulder portion 7c of the spool 7 comes into contact with an opposing end portion 33c (i.e., an opening end portion of the housing part 30) of the center post 33 to restrict movement of the spool 7, and the plunger 34 and the rod 35 move toward the end plate 36.

As illustrated in FIGS. 2 and 4, the breathing hole 6h communicates, via the cutout 7d formed at the spool 7, with the space S housing the plunger 34 and the rod 35, and when the spool 7 is moved toward the solenoid portion 10 (i.e., in a non-energization state), the space S and the breathing hole 6h are communicably connected to each other. The breathing hole 6h formed at the sleeve 6 communicates with the outside of the solenoid valve 3.

As illustrated in FIGS. 2 and 4, a through-hole 34a penetrating the center of the plunger 34 in the axial direction is formed at the plunger 34, and allows communication between a space S1 between the end plate 36 and the plunger 34 and a space S2 between the plunger 34 and the rod 35 in the space S.

Figure 5:
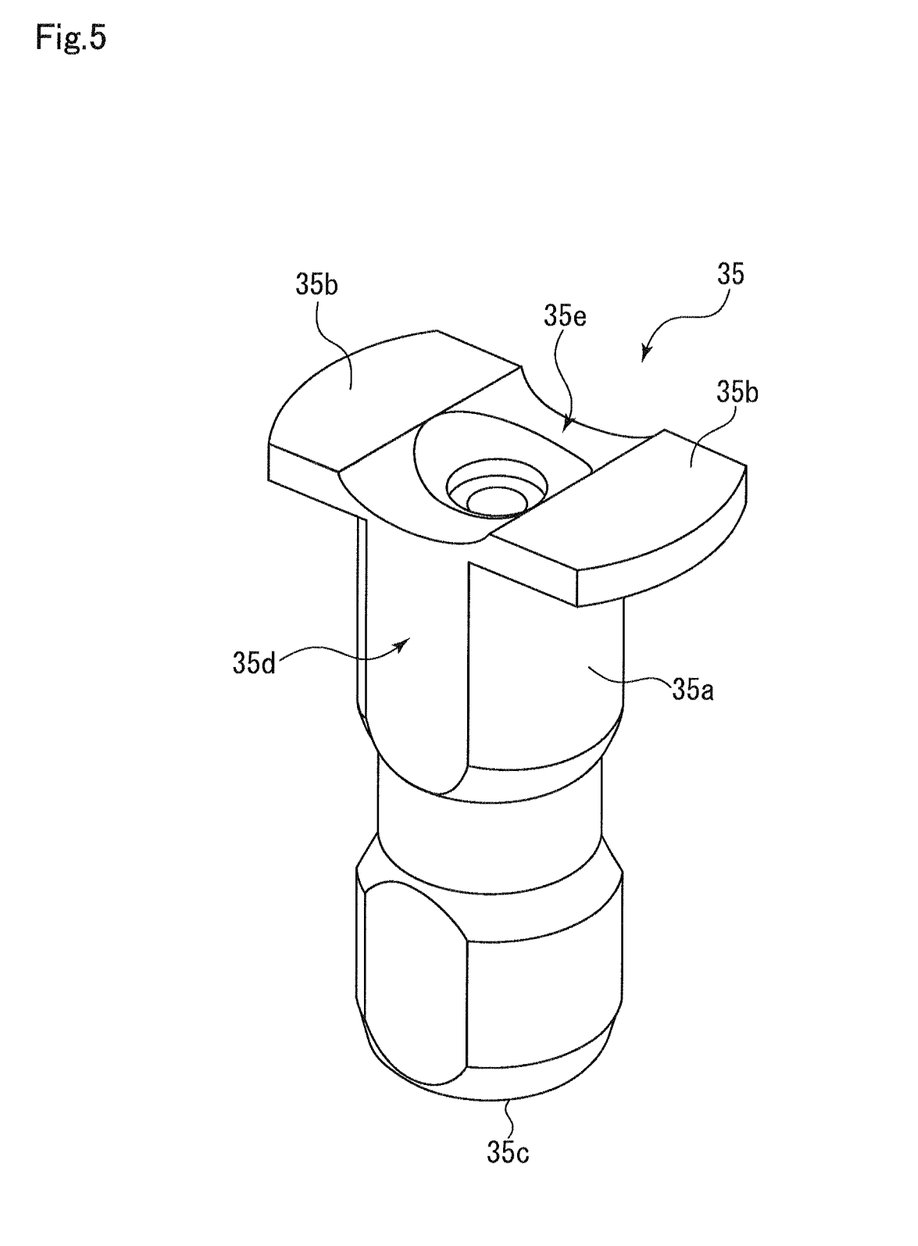
FIG. 5 is a perspective view of a rod in the embodiment.

As illustrated in FIG. 5, the rod 35 includes the solid main body portion 35a having cutout portions 35d (only one side is illustrated) facing each other in parallel with an outer peripheral surface of the rod 35 and having a substantially stadium-shaped section in the radial direction, and the flange portions 35b extending outwardly from one end of the main body portion 35a in the axial direction in a symmetry directions. The cutout portions 35d of the main body portion 35a are formed at positions inside an arc-shaped outer peripheral surface of the main body portion in the radial direction. As illustrated in FIG. 2, a passage P (only one side is illustrated) for communication between both end spaces of the rod 35 in the axial direction is formed between the cutout portion 35d (only one side is illustrated) and the inner periphery 33b of the small-diameter portion of the center post 33 (see FIG. 2).

At the substantially center of one end of the main body portion 35a in the axial direction, a linear opposing groove portion 35e penetrating the cutout portions 35d of the main body portion 35a is formed. The opposing groove portion 35e is, as viewed in the axial direction, formed to pass through the center of the opposing plunger 34 in the radial direction, i.e., the through-hole 34a, and faces the through-hole 34a formed at the plunger 34 to function as a fluid flow path.

The through-hole 34a formed at the plunger 34, the opposing groove portion 35e formed at the rod, the passages P, the through-hole 6b of the sleeve 6 form, as a breathing path allowing the space S housing the plunger 34 and the rod 35 to communicate with the breathing hole 6h, a main path through which most of fluid passes.

Subsequently, fluid movement in the space S upon movement of the plunger 34 by ON/OFF of the solenoid valve 3 will be described with reference to FIGS. 6 and 7. As illustrated in FIG. 6, when the control power is supplied in the non-energization state, the plunger 34 is sucked toward the valve portion 5 to approach an opposing end surface 33d of the center post 33, and the plunger 34 accordingly moves the spool 7 toward the retainer 9 via the rod 35.

At this point, fluid present in the space S2 between the plunger 34 and the opposing end surface 33d of the center post 33 passes, as illustrated in FIG. 6, through the opposing groove portion 35e formed at the rod 35. Part of such fluid flows into the space S1 between the plunger 34 and the end plate 36 from the through-hole 34a formed at the plunger 34, and the remaining fluid is discharged as an excess beyond the capacity of the space S1 from the breathing hole 6h to the outside through the passages P and the through-hole 6b of the sleeve 6. Thus, responsiveness of the solenoid valve 3 can be improved. As described above, part of fluid present between each of the flange portions 35b of the rod 35 and the opposing end surface 33d of the center post 33 directly flows into the passages P, and the remaining fluid is, after having flowed into the opposing groove portion 35e, branched into the space S1 between the plunger 34 and the end plate 36 and the passages P through the through-hole 34a.

The cutout 7d is formed at the end portion of the spool 7 on the plunger 34 side, and the breathing hole 6h and the space S communicate with each other via the cutout 7d even in the OFF state of the solenoid valve 3. Thus, at the beginning of movement of the plunger 34 toward the valve portion 5, part of fluid present in the space S2 between the plunger 34 and the opposing end surface 33d of the center post 33 can be discharged from the breathing path to the outside, and the plunger 34 can be quickly moved.

On the other hand, when the power supplied to the coil 13 is stopped or decreased to move the plunger 34 in a direction away from the valve portion 5, fluid present in the space S1 between the plunger 34 and the end plate 36 passes, as illustrated in FIG. 7, through the opposing groove portion 35e formed at the rod 35 from the through-hole 34a formed at the plunger 34, and flows into the plunger 34 and the space S2 between the rod 35 and the opposing end surface 33d of the center post 33. In this case, the responsiveness of the solenoid valve 3 can be also improved. Note that the breathing hole 6h and the space S communicate with each other via the cutout 7d even in the OFF state of the solenoid valve 3. Thus, according to fluid discharge to the outside by movement of the plunger 34, external fluid flows, as necessary, into the space S through the breathing hole 6h by way of the through-hole 6b of the sleeve 6 and the passages P, and outflow/inflow of fluid, i.e., breathing, is performed through the breathing hole 6h.

As described above, the through-hole 34a formed at the plunger 34 and the opposing groove portion 35e of the rod 35 face each other, and in the housing part 30, fluid can move between the spaces. S1, S2 on both sides of the plunger 34 in a movement direction thereof through the through-hole 34a and the opposing groove portion 35e. Thus, the plunger 34 can be quickly moved with less fluid resistance. Moreover, the flow rate of inflow fluid from the outside through the breathing hole 6h can be reduced while entrance of contaminants into the housing part 30 can be reduced.

The rod 35 has the flange portions 35b extending outwardly from the portion facing the plunger 34 side in the symmetry directions. Thus, the opposing groove portion 35e functioning as the breathing path communicating with the breathing hole 6h can be provided at the portion of the rod 35 facing the plunger 34 side while a large area of contact with the plunger 34 can be ensured by the flange portions 35b. Thus, movement of the plunger 34 can be reliably transmitted to the spool 7. Further, the flange portions 35b are formed to extend outward of the main body portion 35a in the radial direction. Thus, a great width of the opposing groove portion 35e can be ensured, and a great amount of fluid can be quickly guided in the opposing groove portion 35e.

Moreover, the rod 35 includes, at one end thereof, the opposing groove portion 35e, and therefore, fluid flowing on both sides of the plunger 34 via the through-hole 34a of the plunger 34 can flow in or out of the space S2. Thus, the rod 35 can be formed as a solid. Moreover, durability of the rod 35 for transmitting movement of the plunger 34 to the spool 7 is enhanced, and cleaning such as removal of contaminants adhering upon manufacturing of the rod 35 is facilitated.

Further, as illustrated in FIG. 5, the opposing groove portion 35e of the rod 35 is, at an inner surface thereof, formed in an arc shape. Thus, cleaning for the inner surface of the opposing groove portion 35e is more facilitated. Further, stress on the flange portions 35b is dispersed on the arc-shaped inner surface, and therefore, the durability of the rod 35 can be enhanced without stress concentration on the bases of the flange portions 35b.

In addition, the cutout portions 35d formed at the peripheral surface of the main body portion 35a of the rod 35 are formed at positions continuous to the opposing groove portion 35e formed at one end of the rod 35. Thus, fluid guided by the opposing groove portion 35e quickly flows in the passages P defined by the cutout portions 35d, and therefore, the responsiveness of the solenoid valve 3 can be improved.

Moreover, as illustrated in FIG. 5, the main body portion 35a of the rod 35 is formed as the solid, and therefore, the durability of the rod 35 can be enhanced.

The embodiments of the present invention have been described above with reference to the drawings, but specific configurations are not limited to these embodiments. Changes and additions can be made to the present invention without departing from the gist of the present invention.

REFERENCE SIGNS LIST 1 solenoid valve device
2 valve housing
3 solenoid valve
5 valve portion
6 sleeve
6h breathing hole
7 spool
8 spring
9 retainer
10 solenoid portion
11 solenoid case
12 molded solenoid
29 spacer
30 housing part
31 side ring
32 spacer
33 center post (included in a housing part)
33d opposing end surface
34 plunger
34a through-hole
35 rod
35a main body portion
35b, 35b flange portion
35d, 35d cutout portion
35e opposing groove portion
36 end plate
P, P passage
S, S1, S2 space

The invention claimed is:
1. A solenoid valve comprising:
a spool;
a sleeve in which the spool is arranged movably in an axial direction;

a circular plunger arranged on a first end side of the spool to move the spool;

a spring arranged on a second end side of the spool to bias the spool against movement by the circular columnar plunger;

a molded solenoid arranged at an outer periphery of the circular columnar plunger;

a solenoid case configured to house the circular columnar plunger and the molded solenoid;

a housing part housed in the solenoid case and arranged inside the molded solenoid to house the circular columnar plunger in an inner space of the housing part; and a rod arranged in the inner space of the housing part and arranged between the spool and the circular columnar plunger on an extension of a center axis of the circular columnar plunger, the solenoid valve moving the circular columnar plunger by energization to the molded solenoid, wherein the spool is moved via the rod, the sleeve has, on a solenoid case side, a breathing hole penetrating the sleeve in the radial direction and allowing the inner space of the housing part to communicate with an outside when at least the circular columnar plunger is in a predetermined region, the circular columnar plunger has a through-hole penetrating in the axial direction and at the center axis of the circular columnar plunger, the rod is formed as a solid, and the rod is configured such that flange portions extending outwardly in symmetry directions of the radial direction are provided at an opposing end portion facing the circular columnar plunger, cutout portions forming a passage between the rod and an inner periphery of the housing part are formed across the rod as opposed to along an axis of the rod on both sides in the radial direction perpendicular to the flange portions as viewed in the axial direction, an opposing groove portion passing through the center of the circular columnar plunger in a radial direction and penetrating both radial sides provided with the cutout portions of the rod is formed at the opposing end portion, the rod is provided with a central bore recessed in the axial direction and intersecting the opposing groove portion, the central bore having a diameter and a larger diameter at a point at which the central bore intersects the opposing groove portion, thereby causing the opposing groove portion to be constituted by a center groove part and two end groove parts opposed to through the center groove part and causing a depth of the center groove part to be larger than depths of the end groove parts, and inner surfaces of the end groove parts of opposing groove portion are formed in a symmetrical arc shape as viewed in the radial direction.

2. The solenoid valve according to claim 1, wherein the inner space of the housing part and the breathing hole constantly communicate with each other.

* * * * *